United States Patent
Bowen

(10) Patent No.: US 8,327,434 B2
(45) Date of Patent: Dec. 4, 2012

(54) SYSTEM AND METHOD FOR IMPLEMENTING A PROXY AUTHENTICATION SERVER TO PROVIDE AUTHENTICATION FOR RESOURCES NOT LOCATED BEHIND THE PROXY AUTHENTICATION SERVER

(75) Inventor: Peter Bowen, Ottawa (CA)

(73) Assignee: Novell, Inc., Provo, UT (US)

( * ) Notice: Subject to any disclaimer, the term of this patent is extended or adjusted under 35 U.S.C. 154(b) by 769 days.

(21) Appl. No.: 12/541,645

(22) Filed: Aug. 14, 2009

(65) Prior Publication Data

US 2011/0041165 A1 Feb. 17, 2011

(51) Int. Cl.
*H04L 29/06* (2006.01)
(52) U.S. Cl. .......................................... 726/12; 713/153
(58) Field of Classification Search .................. 726/12, 726/2, 3, 11
See application file for complete search history.

(56) References Cited

U.S. PATENT DOCUMENTS

| | | | |
|---|---|---|---|
| 7,607,008 B2 * | 10/2009 | Howard et al. | 713/155 |
| 8,011,002 B1 * | 8/2011 | Upadhyay et al. | 726/12 |
| 2006/0005237 A1 * | 1/2006 | Kobata et al. | 726/12 |
| 2006/0230265 A1 | 10/2006 | Krishna | |
| 2007/0056021 A1 | 3/2007 | Annic et al. | |
| 2008/0052771 A1 | 2/2008 | Delmond et al. | |
| 2008/0134305 A1 | 6/2008 | Hinton et al. | |
| 2009/0094684 A1 | 4/2009 | Chinnusamy et al. | |
| 2009/0126001 A1 | 5/2009 | Krantz et al. | |

* cited by examiner

*Primary Examiner* — Gilberto Barron, Jr.
*Assistant Examiner* — Virginia T Ho
(74) *Attorney, Agent, or Firm* — Pillsbury Winthrop Shaw Pittman LLP

(57) ABSTRACT

Networked resources that are not located behind a proxy authentication server may be enabled to use the proxy authentication server for authentication. This may provide one or more of the features associated with a proxy authentication server (e.g., centralized administration of authentication and/or access information, enhancing software security, centralized administration of permission information, and/or other features) for the resources not located behind the proxy authentication server. These features may be provided without requiring substantial modification of the proxy authentication server.

18 Claims, 2 Drawing Sheets

SYSTEM AND METHOD FOR IMPLEMENTING A PROXY AUTHENTICATION SERVER TO PROVIDE AUTHENTICATION FOR RESOURCES NOT LOCATED BEHIND THE PROXY AUTHENTICATION SERVER

FIELD OF THE INVENTION

The invention relates to enabling networked resources not behind a proxy authentication server to use the proxy authentication server for authentication.

BACKGROUND OF THE INVENTION

Proxy authentication servers are known to provide enhanced security over networked resources. Placing resources behind a proxy authentication server on a network enables the security and access of the resources to be managed, controlled, and/or monitored in a centralized and convenient manner. However, typically the benefits provided by a proxy authentication server are only provided with respect to the resources located behind the proxy authentication server.

SUMMARY

One aspect of the invention relates to a system and method that enable networked resources that are not located behind a proxy authentication server to use the proxy authentication server for authentication. This may provide one or more of the features associated with a proxy authentication server (e.g., centralized administration of authentication and/or access information, enhancing software security, centralized administration of permission information, and/or other features) for the resources not located behind the proxy authentication server. These features may be provided without requiring substantial modification of the proxy authentication server.

In some implementations, a system may include one or more of a client, a proxy authentication server, a server not located behind the proxy authentication server, an identification server communicatively linked with the proxy authentication server, and/or other components.

In operation, the proxy authentication server may be configured to receive a request from the client for access to a server and/or resources located behind the proxy authentication server. Based on the received request, the proxy authentication server may evaluate whether or not the request is valid and, if the request is valid, connect the client with the requested resource and/or the server serving the requested resource. By way of non-limiting example, the proxy authentication server may be implemented by executing one or more computer applications such as, for example, Novell iChain, Squid, Novell Access Manager, Sun OpenSSO Enterprise, and/or other computer applications.

The proxy authentication server may be configured such that to obtain access to one or more of resources behind the proxy authentication server, a client must be authenticated. The client may be authenticated based on authentication information provided to the proxy authentication server. The authentication information may include, for example, authentication information input to the client by a user or group of users. The authentication information may include, for example, a user name, a password, a login ID, a security question answer, and/or other authentication information.

The proxy authentication server may provide for centralized control over permissions and/or security of servers and/or resources located behind the proxy authentication server. Since access by clients to such servers and/or resources passes through the proxy authentication server, permissions of users to access certain ones of servers and/or resources can be configured on the proxy authentication server without making such adjustments on the individual downstream servers and/or other resources separately from each other. Similarly, changes in the security features used to protect the servers and/or resources located behind the proxy authentication server from unauthorized access may be made on the proxy authentication server without repeating efforts downstream.

By coupling the identification server with the proxy authentication server, the proxy authentication server may be implemented to control user access to servers and/or resources that are not necessarily behind proxy authentication server. This may provide some or all of the benefits of the security and/or convenience provided by the proxy authentication server (e.g., those set forth above) to be extended to networked assets that are not behind the proxy authentication server.

In order to access one or more resources that are not located behind the proxy authentication server, the client may generate a request to the server serving such resources. The request may include client information that identifies the client and/or the user(s) of the client. For example, the client information may include a MAC address, an IP address, a cookie, information input to the client by the user (e.g., username, etc.), and/or other information that identifies the client and/or the user(s).

In response to receiving this request, the server may transmit a request for an identifier that is associated with the client (and/or its user(s)) to the proxy authentication server and/or the identification server. The identifier may include, for example, a uniform resource locator, an extensible resource identifier, and/or other identifiers. In some implementations, the identifier is an OpenID identifier, or an identifier in another authentication protocol. The request may include one or both of client information that identifies the client and/or the user(s), and/or request information related to the request for the one or more of resources that was transmitted to the server from the client. The request information may include, for example, information identifying the server as the server queried in the request, information identifying the resource(s) queried by the request, and/or other information associated with the request.

The identification server may be configured to provide the requested identifier to the requesting server in the event that the client is determined to be authenticated by proxy authentication server. The identification server may be located behind the proxy authentication server with respect to the client. By way of non-limiting example, the identification server may be an OpenID provider and/or a provider of other types of information providing identification and/or authentication verification. It will be appreciated that implementing a standardized protocol like OpenID in the identification server may decrease the amount of customization required to provide the proxy authentication server and identification server with the appropriate functionality, and may enhance the number of external servers that can operate with the proxy authentication server and the identification server to authenticate users.

Based on the request for an identifier, the proxy authentication server may determine whether the client is authenticated. This may include querying a login/logout record maintained by the proxy authentication server of the clients and/or users currently logged in and/or logged out to the proxy authentication server. Determining whether the client is authenticated to the proxy authentication server may include going through the authentication process with the client (e.g., if the login/logout record does not indicate that client 16 is currently logged in, or if a new authentication is required for authenticating the client to the external server).

To authenticate the client to the proxy authentication server, a redirection instruction may be generated to the client from the proxy authentication server and/or the identification server. The redirection instruction may direct the client to a network location (e.g., a uniform resource locator) associated an authentication form hosted by the proxy authentication server.

Upon receiving the redirection instruction, the client may request the authentication form from the proxy authentication server via the network location indicated in the redirection instruction. The proxy authentication server may then serve the authentication form to the client. The authentication form may include one or more fields into which a user of the client may input authentication information.

The proxy authentication server may receive the authentication information input by the user into the authentication form through the client. Based on the received authentication information (e.g., by comparing the received information with stored authentication information), the proxy authentication server may authenticate the client, or decline authentication to the client. If the proxy authentication server declines authentication to the client, the declination of authentication is conveyed to the user through the client, and access to the requested resource(s) may be denied.

If the proxy authentication server determines that the client is authenticated, the proxy authentication server may generate an authentication verification to the identification server. The authentication verification may include information identifying the client, a user (or group of users) of the client, the server requesting an identifier, the resource requested of the external server, and/or other information.

Upon receiving the authentication verification, the identification server may provide the identifier corresponding to the client (and/or the user(s) of the client) to the requesting external server to indicate that the client is authenticated to the proxy authentication server. The identification server may provide the identifier to the requesting external server in an identifier transmission. The identifier transmission may include information in addition to the identifier. The information included in the identifier transmission may include, for example, information related to the request for an identifier transmitted from the external requesting server to the proxy authentication server and/or the identification server, information related to the request transmitted from the client to the external server, and/or other information. If the identification server is located behind the proxy authentication server, then the identification server transmits the identifier transmission to the external requesting server through the proxy authentication server. In some implementations, some or all of the information in addition to the identifier included in the identifier transmission may be added to the identifier transmission by the proxy authentication server.

Once the external server receives the identifier transmission, the external requesting server can be assured that the client has been authenticated to the proxy authentication server. Thus, on the basis of the identifier transmission, the requesting external server may provide access to the one or more resources requested by the client.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
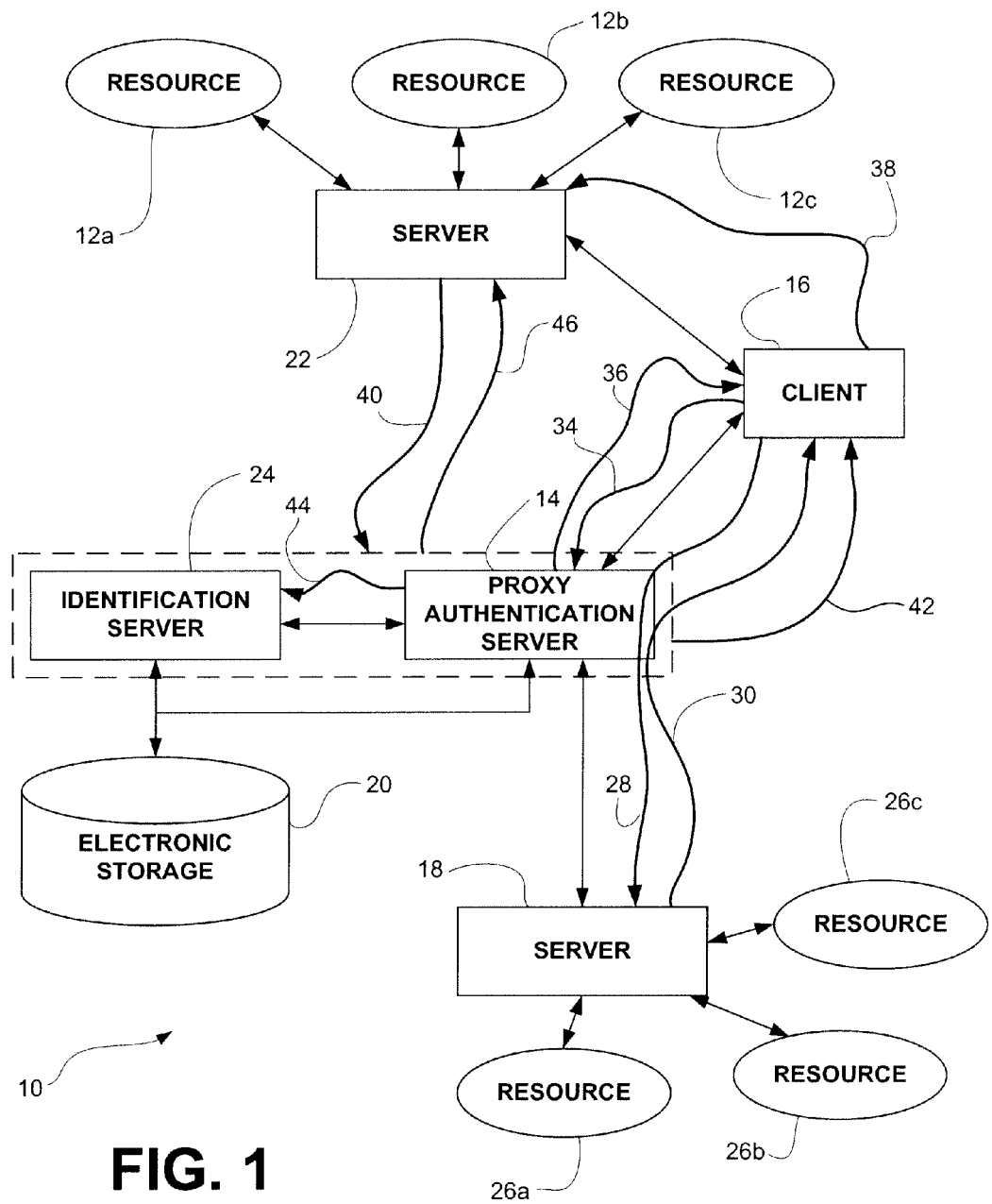
FIG. 1 illustrates a system configured to enable networked resources not behind a proxy authentication server to use the proxy authentication server for authentication, in accordance with one or more embodiments of the invention.

FIG. 1 illustrates a system 10 configured to enable networked resources 12 (illustrated in FIG. 1 as resources 12a, 12b, and 12c) not behind a proxy authentication server 14 to use proxy authentication server 14 for authentication. This may provide one or more of the features associated with a proxy authentication server (e.g., centralized administration of authentication and/or access information, enhancing software security, centralized administration of permission information, and/or other features) for resources 12 not located behind proxy authentication server 14. The system 10 may provide these features without requiring modification of proxy authentication server 14. In some implementations, system 10 may include one or more of a client 16, a server 18 behind proxy authentication server 14, electronic storage 20, proxy authentication server 14, a server 22 not behind proxy authentication server 14, an identification server 24, and/or other components.

Client 16 may include a computing platform that enables a user to access system 10. The client 16 may be implemented on the computing platform by executing one or more computer programming modules with one or more processors to request resources (e.g., information, web pages, processing, files, documents, and/or other resources) from servers serving the requested resources (e.g., server 18 and/or server 22). The computing platform may include an electronic device capable of transmitting such requests. By way of non-limiting example, the computing platform may include one or more of a desktop computer, a laptop computer, a handheld computer, a netbook, a mobile telephone, a personal digital assistant, and/or other computing platforms. The one or more computer programming modules executed by the computing platform may include a web browser and/or other client applications.

The server 18 may include any combination of hardware or software configured to serve resources 26 (illustrated in FIG. 1 as 26a, 26b, and 26c). In particular, within the context of this disclosure, server 18 may refer to hardware and/or software that serves resources 26 to client 16 over one or more networks. These networks may include one or more of a local area network, a wide area network, an intranet, the Internet, and/or other networks. The resources 26 may include one or more of a web page, an application, a file, a document, a script, a database, and/or other resources. In operation, server 18 receives requests for one or more of resources 26 from client 16, accesses the appropriate one or more of resources 26, and passes the results of the request back to client 16.

The server 18 may be located behind proxy authentication server 14. As used herein, a resource or server located "behind" proxy authentication server 14 is a resource or server that must be accessed by client 16 through proxy authentication server 14. By way of example, a request 28 from client 16 to server 18 for one or more of resources 26 may be transmitted through proxy authentication server 14. Similarly, a response 30 generated by server 18 based on request 28 may be transmitted to client 16 through proxy authentication server 14. As such, proxy authentication server 14 acts as an intermediary between client 16 and server 18.

In one embodiment, electronic storage 20 comprises electronic storage media that electronically stores information. The electronically storage media of electronic storage 20 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may store software algorithms, information determined by proxy authentication server 14 and/or identification server 24, information received via from client 16, and/or other information that enables system 10 to function properly. Electronic storage 20 may be a separate component within system 10, or electronic storage 20 may be provided integrally with one or more other components of system 10 (e.g., proxy authentication server 14 and/or identification server 24). Electronic storage 20 may provide a common storage accessible to both proxy authentication server 14 and identification server 24, or electronic storage 20 may include two (or more) separate information stores that are separately accessible by one or the other of proxy authentication server 14 or identification server 24.

The proxy authentication server 14 may include any combination of hardware and software configured to provide the features attributed herein to proxy authentication server 14. For example, proxy authentication server 14 may include a computing platform separate from a computing platform providing the functionality of server 18. The computing platform providing the functionality of proxy authentication server 14 may communicated with the computing platform providing the functionality of server 18 via a network.

In operation, proxy authentication server 14 may be configured to receive request 28 from client 16, evaluate whether or not request 28 is valid and, if request 28 is valid, connecting with server 18 to request the appropriate one of resources 26 on behalf of client 16. The response 30 to request 28 from server 18 may be transmitted to client 16 via proxy authentication server 14. It will be appreciated that the depiction of request 28 as being provided to server 18 may be merely illustrative in some instances. For example, proxy authentication server 14 may maintain a cache, and may serve, request 28 for one or more of resources 26 from this cache without providing request 28 to server 18. Nevertheless, serving of request 28 from a cache associated with proxy authentication server 14 may be substantially transparent to client 16, and is considered for the purposes of this disclosure to be similar to, if not the same as, instances in which request 28 passes through 14 all the way to server 18.

Proxy authentication server 14 may include one or more computing devices executing computer one or more computer programs to provide the proxy authentication functionality described herein. By way of non-limiting example, proxy authentication server 14 may include one or more computing devices executing Novel iChain, Squid, Novell Access Manager, Sun OpenSSO Enterprise, and/or other proxy server software.

Although FIG. 1 depicts proxy authentication server 14 as acting as an intermediary between a single server (server 18) and client 16, it will be appreciated that this is for illustrative purposes only. The server 18 may represent a plurality of different servers located behind proxy authentication server 14 that client 16 accesses through proxy authentication server 14.

Access to resources 26 served by server 18 may be controlled by proxy authentication server 14. For example, although FIG. 1 illustrates a single client (e.g., client 16), a plurality of different clients may be connected with proxy authentication server 14 in an attempt to access resources 26. The proxy authentication server 14 may be configured such that to obtain access to one or more of resources 26, client 16 must be authenticated. The client 16 may be authenticated based on authentication information provided to proxy authentication server 14. The authentication information may include, for example, authentication information input to client 16 by a user. As used herein, a "user" may refer to a single user, and/or to a group of individuals that are considered by system 10 to be a single entity, or associated entities, such as a household, a family, a workgroup, or other groups of individuals considered to be a single entity or group of associated entities.

In order to become authenticated on proxy authentication server 14, client 16 may make a transmission 34 of authentication information to proxy authentication server 14. The transmission 34 of authentication information may be provided to proxy authentication server 14, for example, in response to a request 36 for authentication information from proxy authentication server 14. The authentication information may include, for example, a user name, a password, a login ID, a security question answer, and/or other authentication information.

Upon receiving transmission 34 of authentication information, proxy authentication server 14 may determine whether or not to authenticate client 16 on the basis of the received authentication information. This may include comparing the received authentication information with previously stored authentication information associated with users of system 10. Such authentication information may be stored, for example, within electronic storage 20. If proxy authentication server 14 determines that the received authentication information corresponds to stored authentication information associated with a given user, proxy authentication server 14 may authenticate client 16 as corresponding to the given user. On the basis of this authentication, proxy authentication server 14 may provide client 16 with access to appropriate ones of resources 26 (e.g., resources 26 set to be available to the given user).

The proxy authentication server 14 may provide for centralized control over permissions and/or security of server 18 and/or resources 26. Since access by client 16 to server 18 and resources 26 passes through proxy authentication server 14, permissions of users to access certain ones of resources 26 can be configured on proxy authentication server 14 without making such adjustments on server 18 and/or other servers behind proxy authentication server 14 individually. Similarly, changes in the security features used to protect resources 26 from unauthorized access may be made on proxy authentication server 14 without repeating efforts "downstream" on server 18 and/or other servers behind proxy authentication server 14.

The server 22 may include any combination of hardware or software configured to serve resources 12. In particular, within the context of this disclosure, server 22 may refer to hardware and/or software that serves resources 12 to client 16 over one or more networks. These networks may include one or more of a local area network, a wide area network, an intranet, the Internet, and/or other networks. The resources 12 may include one or more of a web page, an application, a file, a document, a script, a database, and/or other resources. In operation, server 22 receives requests for one or more of resources 12 from client 16, accesses the appropriate one or more of resources 12, and passes the results of the request back to client 16.

As can be seen in FIG. 1, server 22 may not be located behind proxy authentication server 14. As such, unless other mechanisms for restricting access to resources 12 are incorporated into server 22, or upstream from server 22, access to resources 12 by client 16 may be unfettered. For example, server 22 may be configured to restrict access to resources 12 based on authentication of client 16 at proxy authentication server 14. It will be appreciated that the depiction of server 22 as a single server in FIG. 1 is for illustrative purposes only. The server 22 may represent a plurality of servers serving resources for client 16.

In order to access one or more of resources 12, client 16 may generate a request 38 to server 22 for one or more of resources 12. Request 38 may include client information that identifies client 16 and/or the user of client 16 to server 22. For example, the client information may include a MAC address, an IP address, a cookie, information input to client 16 by the user (e.g., username, etc.), and/or other information that identifies client 16 and/or the user.

In response to receiving request 38, server 22 may transmit a request 40 for an identifier that is associated with client 16 (and/or its user(s)) to proxy authentication server 14 and/or identification server 24. The identifier may include, for example, a uniform resource locator, an extensible resource identifier, and/or other identifiers. In some implementations, the identifier is an OpenID identifier, or an identifier in another authentication protocol. The request may include one or both of client information that identifies client 16 and/or the user, and/or request information related to the request for one or more of resources 12 transmitted to server 22 from client 16. The request information may include, for example, information identifying server 22 as the server queried in the request, information identifying the resource(s) 12 queried by the request, and/or other information associated with the request.

The identification server 24 may include any combination of hardware and software configured to provide the features attributed herein to identification server 24. For example, identification server 24 may include a computing platform separate from a computing platform providing the functionality of proxy authentication server 14 and/or server 18. As another example, identification server 24 may include some or all of the same computing platform that is providing the functionality of proxy authentication server 14.

The identification server 24 may be configured to provide the requested identifier to server 22 in the event that client 16 is currently authenticated to proxy authentication server 14. Identification server 24 may be located behind proxy authentication server 14 with respect to client 16. By way of non-limiting example, identification server 24 may be an OpenID provider and/or a provider of other types of information providing identification and/or authentication verification. It will be appreciated that implementing a standardized protocol like OpenID in identification server 24 may decrease the amount of customization required to create system 10, and may enhance the number of external servers (e.g., server 22) that can operate with proxy authentication server 14 and identification server 24 to authenticate users.

Upon receiving request 40 (and/or notification of request 40 from identification server 24) proxy authentication server 14 may determine whether client 16 is authenticated to proxy authentication server 14. This may include querying a login/logout record maintained by proxy authentication server 14 of the clients and/or users currently logged in and/or logged out to proxy authentication server 14. Determining whether client 16 is authenticated to proxy authentication server 14 may include going through the authentication process with client 16 (e.g., if the login/logout record does not indicate that client 16 is currently logged in, or if a new authentication is required for authenticating client 16 to server 22).

To authenticate client 16 to proxy authentication server 14 a redirection instruction 42 may be generated to client 16. The redirection instruction 42 may direct client 16 to a network location (e.g., a uniform resource locator) associated an authentication form hosted by proxy authentication server 14.

Upon receiving redirection instruction 42, client 16 may request the authentication form from proxy authentication server 14 via the network location indicated in redirection instruction 42. The proxy authentication server 14 may then serve the authentication form to client 16. The authentication form may include one or more fields into which a user of client 16 may input authentication information.

The proxy authentication server 14 may receive the authentication information input by the user into the authentication form through client 16. Based on the received authentication information (e.g., by comparing the received information with stored authentication information), proxy authentication server 14 may authenticate client 16, or decline authentication to client 16. If proxy authentication server 14 declines authentication to client 16, the declination of authentication is conveyed to the user through client 16, and access to the requested resource(s) 12 may be denied.

If proxy authentication server 14 determines that client 16 is authenticated, proxy authentication server 14 may generate an authentication verification 44 to identification server 24. The authentication verification 44 may include information identifying client 16, a user (or group of users) of client 16, the server requesting an identifier (e.g., server 22), the resource requested of the external server (e.g., resources 12), and/or other information.

Upon receiving authentication verification 44, identification server 24 may provide the identifier corresponding to client 16 (and/or the user(s) of client 16) to server 22 to indicate that client 16 is authenticated to proxy authentication server 14. The identification server 24 may provide the identifier to server 22 in an identifier transmission 46. The identifier transmission 46 may include information in addition to the identifier. The information included in identifier transmission 46 may include, for example, information identifying request 40 transmitted from server 22, information identifying the resource requested of the external server (e.g., resources 12), information identifying request 38, and/or other information. If identification server 24 is located behind proxy authentication server 14, then identification server 24 transmits identifier transmission 46 to server 22 through proxy authentication server 14. In some implementations, some or all of the information in addition to the identifier included in identifier transmission 46 may be added to identifier transmission 46 by proxy authentication server 14.

Once server 22 receives identifier transmission 46, server 22 can be assured that client 16 has been authenticated to proxy authentication server 14. Thus, on the basis of identifier transmission 46, server 22 may provide access to the one or more resources 12 requested by client 16.

Figure 2:
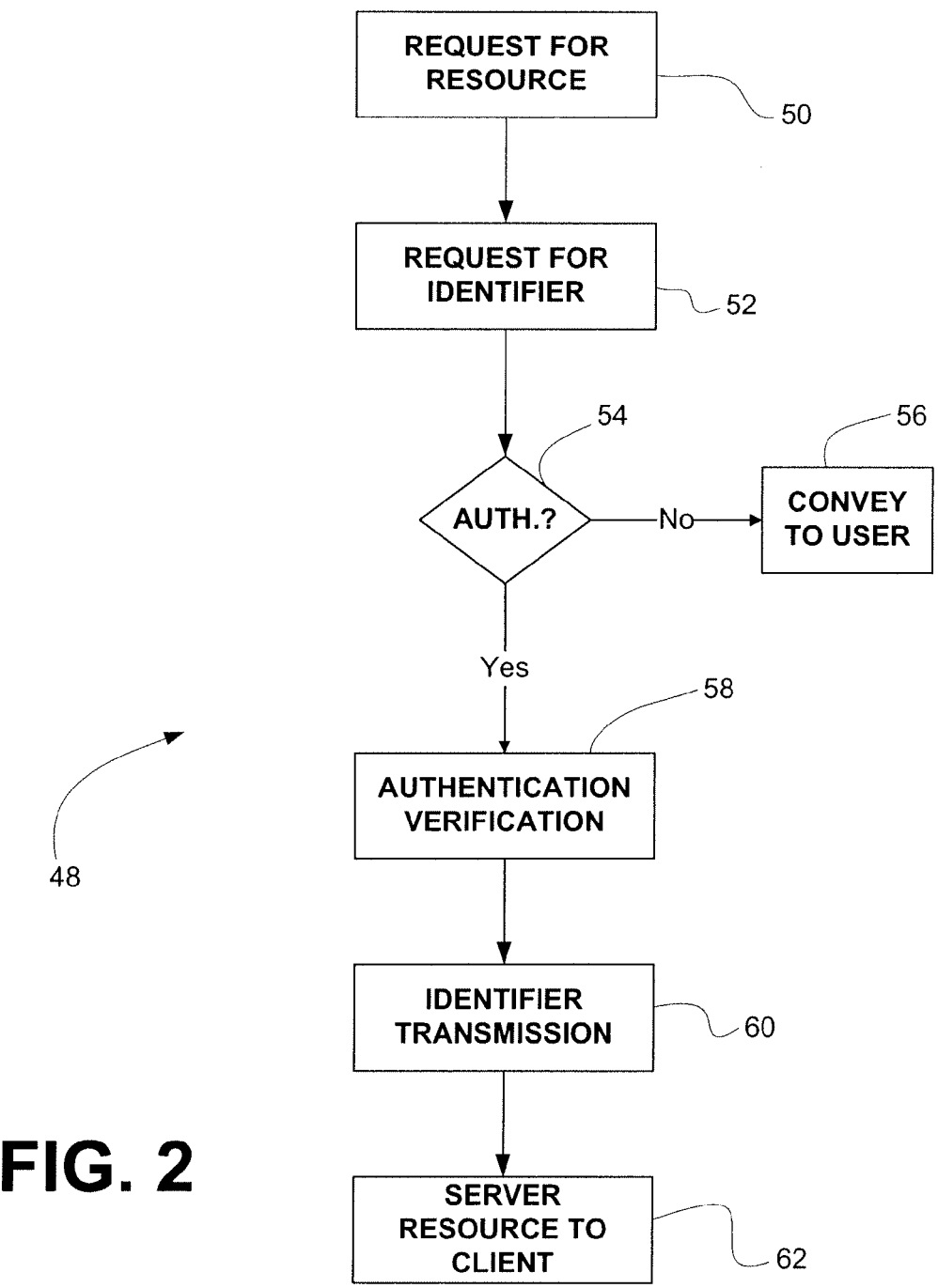
FIG. 2 illustrates a method of enabling networked resources not behind a proxy authentication server to use the proxy authentication server for authentication, according to one or more embodiments of the invention.

FIG. 2 illustrates a method 48 of enabling networked resources not behind a proxy authentication server to use the proxy authentication server for authentication. The operations of method 48 presented below are intended to be illustrative. In some embodiments, method 48 may be accomplished with one or more additional operations not described, and/or without one or more of the operations discussed. Additionally, the order in which the operations of method 48 are illustrated in FIG. 2 and described below is not intended to be limiting.

As discussed below, method 48 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 48 in response to instructions stored electronically on an electronic storage medium. The one or more processing devices may include one or more devices configured through hardware, firmware, and/or software to be specifically designed for execution of one or more of the operations of method 48.

Method 48 may include an operation 50. At operation 50 a request for a resource that is not located may be transmitted from a client to a server that is serving the requested resource. The request may include information identifying the client, the user(s) of the client, and/or other information associated with the request. For example, the request may be similar to or the same as request 38 (shown in FIG. 1 and described above).

At an operation 52, the server that received the request at operation 50 may generate a request for an identifier associated with the client (and/or its user(s)). The request generated may be transmitted to a proxy authentication server and/or an identification server in operative communication with the proxy authentication server. The request for the identifier may include information identifying the client (and/or its user(s)), information identifying the server generating the request, information identifying the resource requested from the server by the client, and/or other information. For example, the request for an identifier may be similar to or the same as request 40 (shown in FIG. 1 and described above).

At an operation 54, the proxy authentication server may determine if the client is currently authenticated. This may include determining if the client is currently logged in to the proxy authentication server and/or may include requesting authentication information from the client and then verifying the received authentication information.

If the client is not currently authenticated (and/or cannot be authenticated) by the proxy authentication server at operation 54, method 48 may proceed to an operation 56 at which the user(s) of the client are informed that authentication was not achieved. If the client is determined by the proxy authentication server to be authenticated at operation 54, then method 48 may proceed to an operation 58.

At operation 58, an authentication verification may be transmitted from the proxy authentication server to the identification server in operative communication therewith. The authentication verification may indicate to the identification server that the proxy authentication server has authenticated the client (and/or its user(s)). The authentication verification may include information related to the request transmitted by the client in operation 50. For example, the authentication verification may include information identifying the server serving the requested resource, information identifying the requested resource, and/or other information. For example, the authentication may be similar to or the same as authentication verification 44 (shown in FIG. 1 and described above).

At operation 60, the identification server responds to the reception of the authentication verification in operation 58 by initiating transmission of the requested identifier to the server serving the requested resource(s). The identifier may be transmitted to the server in an identifier transmission. The identifier transmission may include information other than the identifier. For instance, the identifier transmission may include information identifying the request transmitted at operation 50, information identifying the client (and/or its user(s)), information identifying the requested resource(s), and/or other information. For example, the identifier transmission may be the same as or similar to identifier transmission 46 (shown in FIG. 1 and described above).

At an operation 62, the server that received the request at operation 50 serves the requested resource to the client based on reception of the identifier in the identifier transmission at operation 60.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to enable networked resources not behind a proxy authentication server to use the proxy authentication server for authentication, the system comprising:

electronic storage configured to store information related to one or more users, wherein the stored information for individual users includes authentication information;

a proxy authentication server configured to act as an intermediary between a client operated by a user and one or more servers behind the proxy authentication server that are configured to serve client requests to a first set of one or more resources, the proxy authentication server being further configured to authenticate the client based on a comparison between authentication information received from the client and authentication information stored in the electronic storage;

an identification server communicatively linked with the proxy and configured to transmit an identifier that authenticates the client to one or more servers not behind the proxy authentication server;

wherein the proxy authentication server and the identification server are further configured to (i) receive an authentication request from a server that is not located behind the proxy server and is configured to serve client resources to a second set of one or more resources, (ii) in response to receiving such a request, to initiate a determination by the proxy authentication server as whether or not the client is currently authenticated by the proxy authentication server, and (iv) to transmit the identifier from the identification server to the server not behind the proxy authentication server only if the proxy authentication server determines that the client is currently authenticated.

2. The system of claim 1, wherein the proxy authentication server and the identification server are further configured to direct the client to the proxy authentication server to enable the proxy authentication server to request authentication information from the client only if the proxy authentication server determines that the client is not currently authenticated.

3. The system of claim 2, wherein the proxy authentication server is further configured such that if the client is not currently authenticated and is directed to the proxy authentication server, the proxy authentication server (i) requests authentication information from the client, (ii) receives authentication information from the client, (iii) compares the received authentication information with authentication information stored in the electronic storage, (iv) authenticates the client only if the received authentication information corresponds to stored authentication information, and (v) transmits an indication of the authentication to the identification server.

4. The system of claim 3, wherein the identification server is further configured to receive the indication of the authentication of the client from the proxy authentication server, and to transmit the identifier to the server not behind the proxy authentication server in response to reception of the indication of authentication.

5. The system of claim 1, wherein the client comprises a processor executing a web browser application.

6. The system of claim 1, wherein the identification server comprises an identity provider.

7. The system of claim 6, wherein the identity provider is an OpenID provider.

8. The system of claim 1, wherein the authentication information comprises login information.

9. The system of claim 8, wherein the login information includes a user identification and a password.

10. A method of enabling of networked resources not behind a proxy authentication server to use the proxy authentication server for authentication, the method comprising:
receiving, at an identification server and/or a proxy authentication server communicatively linked with each other, a request from a server not behind the proxy authentication server for an identifier that authenticates a client to the server not behind the proxy authentication server;
determining, via the proxy authentication server, whether the client is currently authenticated to the proxy authentication server; and
transmitting the identifier from the identification server to the server not behind the proxy authentication server only if the proxy authentication server determines that the client is currently authenticated to the proxy authentication server.

11. The method of claim 10, further comprising directing the client to the proxy authentication server to enable the proxy authentication server to request authentication information from the client only if the proxy authentication server determines that the client is not currently authenticated.

12. The method of claim 11, further comprising:
storing information related to one or more users to machine-readable electronic storage media, wherein the stored information for individual users includes authentication information;
transmitting a request from the proxy authentication server to the client for authentication information from the client;
receiving authentication information at the proxy authentication server from the client;
comparing the received authentication information with authentication information stored in the electronic storage media;
authenticating the client only if the received authentication information corresponds to stored authentication information; and
transmitting an indication of the authentication from the proxy authentication server to the identification server.

13. The method of claim 12, further comprising:
receiving the indication of the authentication of the client from the proxy authentication server; and
transmitting the identifier to the server not behind the proxy authentication server in response to reception of the indication of authentication.

14. The method of claim 10, wherein the client comprises a processor executing a web browser application.

15. The method of claim 10, wherein the identification server comprises an identity provider.

16. The method of claim 15, wherein the identity provider is an OpenID provider.

17. The method of claim 10, wherein the authentication information comprises login information.

18. The method of claim 17, wherein the login information includes a user identification and a password.

* * * * *